Patented Nov. 11, 1930

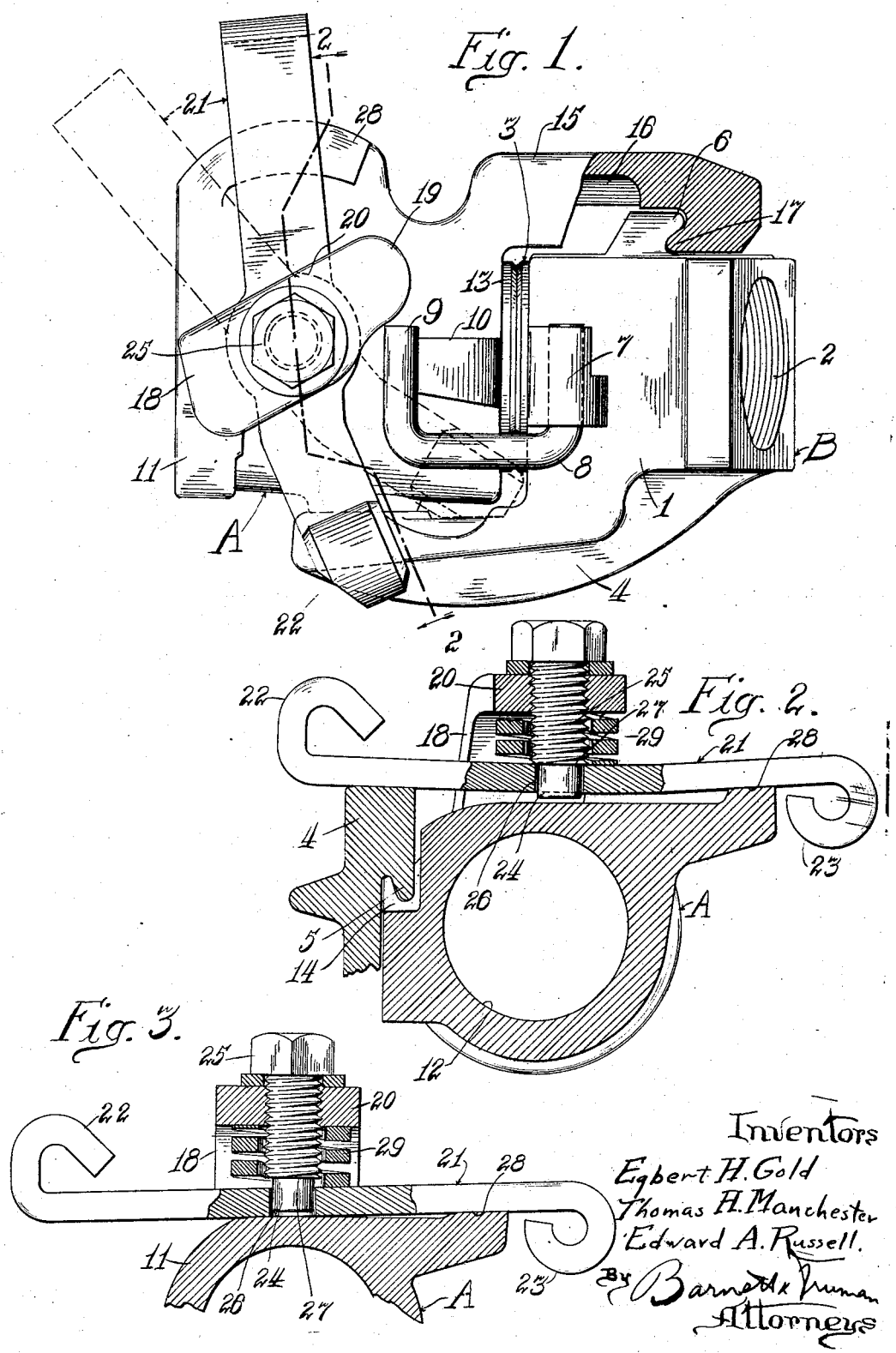

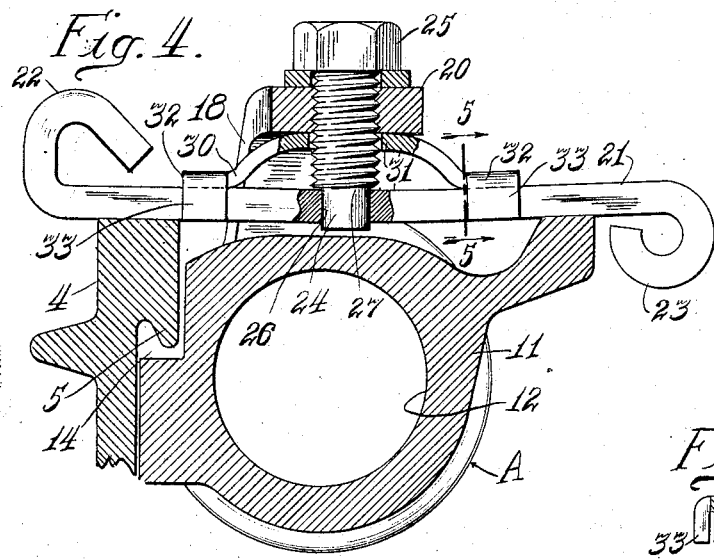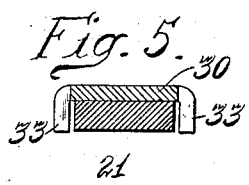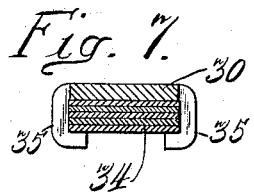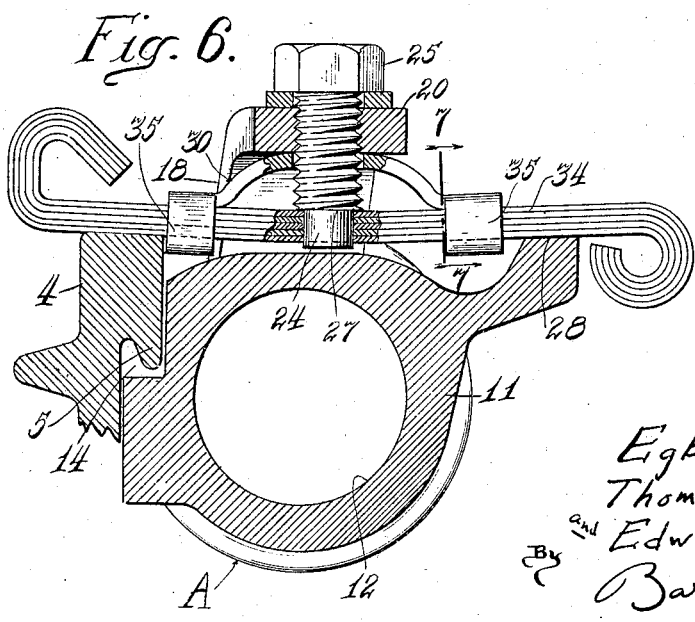

1,781,543

UNITED STATES PATENT OFFICE

EGBERT H. GOLD, OF EVANSTON, AND THOMAS H. MANCHESTER AND EDWARD A. RUSSELL, OF CHICAGO, ILLINOIS; SAID MANCHESTER AND SAID RUSSELL ASSIGNORS TO VAPOR CAR HEATING COMPANY, INC., OF CHICAGO, ILLINOIS, A CORPORATION OF NEW YORK; MARGARET JAYNE GOLD AND BISCAYNE TRUST COMPANY EXECUTORS OF SAID EGBERT H. GOLD, DECEASED

HOSE COUPLER

Application filed August 19, 1927. Serial No. 214,092.

This invention relates to hose couplings for connecting together the hoses or equivalent flexible metallic structures on the train-pipes, steam or air, of railway cars; and the object of the invention is to provide, more particularly in couplings for steam train-pipe connections, new and improved means for locking together the couplers or mating members of the coupling.

It has been customary to provide couplers with locking devices of one sort or another, which are forced with wedging pressure against the arms of the mating couplers to hold the couplers in locked relation as against the tendency to be rocked on their cams and disengaged by pull on the hoses when the train rounds a curve, for example. Such positive wedge locks are effective, but the wedging pressure, especially as the locks are frequently driven into place by a hammer, is likely to injure the gaskets and also to strain or bend the coupler arms and mutilate the cams.

This invention relates to a type of wedge lock, which will yield so that injury to the couplers and gaskets is prevented and the efficiency of the lock increased and its manipulation made easier.

Also each half of the coupling is adapted to mate interchangeably with any similar coupling half. In other words, a single coupling member is usually coupled with a series of different coupling members successively, and since there is bound to be some little variation in the forms and proportions of the different coupling members, it is essential that the locking device be yieldable throughout a considerable range in order to meet the varying conditions to which it is subjected.

One object of the invention is to provide a locking device which is first swung to locking position and simultaneously wedged yieldingly into engagement with the arm of a mating coupler, in combination with an auxiliary spring member which is adapted to yield first in response to a bodily movement of the spring locking member, whereby an increased yielding movement of the locking member is permitted without unduly stressing the locking member itself.

Another object is to provide means for limiting the flexure of the auxiliary spring device so that the final yielding movement must be supplied entirely by the locking member itself.

Another object is to provide an improved form of laminated locking bar, whereby increased resiliency is obtained.

Other objects and advantages of this invention will be more apparent from the following detailed description of certain approved forms of the apparatus.

In the accompanying drawings:

Fig. 1 is a plan view of a hose coupler constructed in accordance with this invention, and shown as mated with a coupler of known construction.

Fig. 2 is a vertical section taken substantially on the line 2—2 of Fig. 1.

Fig. 3 is a view similar to Fig. 2, but showing the locking member in unlocked position, that is when not in engagement with a mating coupler.

Fig. 4 is a view similar to Fig. 2, showing a modification.

Fig. 5 is a vertical sectional detail, taken substantially on the line 5—5 of Fig. 4.

Fig. 6 is a view similar to Figs. 2 and 4, showing still another modification.

Fig. 7 is a vertical section taken substantially on the line 7—7 of Fig. 6.

Referring first to the form of the invention shown in Figs. 1 to 3 inclusive, a hose coupler is illustrated consisting of two members or couplers A and B; coupler A being provided with the lock of the present invention and the coupler B being a hose coupler of known type. The coupler of this invention is designed so that it will mate with any of the different types of so-called gravity hose couplers now in use on steam railroads in this country for making the connection between the steam train pipes on adjacent cars of railroad trains; coupler B being shown as typical or illustrative of couplers of this general type, of which there are several different makes.

Coupler B consists of a head 1 formed with the steam port 2, in which is arranged a gasket 3, and with a forwardly projecting arm 4 provided with an undercut lug or cam 5, and on the other side of the head from arm 4, with a cam lug 6. Projecting from the top of head 1 is a lug 7, in which is pivoted a locking link 8, the angularly disposed end 9 of which is adapted to engage with a lug 10 formed on the mating coupler member.

The improved coupler A comprises a head 11 formed with a steam port 12, a gasket 13 being suitably positioned in a gasket seat at the outer end of port 12. On one side of the coupler head 11 is the usual undercut lug or cam 14 adapted to be engaged by the cam 5 of coupler B. The arm 15 of coupler A consists of a curved or concavo-convex web portion 16 terminating in a thickened portion provided with a cam 17 for engagement with the cam 6 on the head of coupler B.

The improved locking device forming the subject matter of the present invention is carried by the coupler A. Arranged diagonally on top of and preferably cast integral with the head 11 is a housing or bracket consisting of upright members 18 and 19 and a connecting member 20. The locking member 21 is formed of a bar of resilient or spring metal, capable of yielding or flexing to some extent, and is preferably provided with return bent end portions 22 and 23 which serve as heads to be engaged by a hammer or other tool in the process of driving the locking member from one position to another. The locking bar 21 is intermediately pivoted to swing in a substantially horizontal plane on the downwardly projecting reduced end portion 24 of bolt 25 which is screwed into the cross member 20 of the bracket. The aperture 26 in the locking bar 21 is of a slightly greater diameter than the reduced end portion 24 of bolt 25, so that the locking bar can pivot and swivel to some extent on this stud 24, and also move bodily longitudinally of the stud, as hereinafter explained. However, the main upper portion of bolt 25 is of sufficiently greater diameter than the aperture 26 to provide an annular shoulder 27 at the upper end of reduced portion 24, which acts as an abutment or fulcrum for the locking bar 21, thus limiting upward movement of the locking bar. An arcuate cam or wedge surface 28 is formed on the upper face of head 11, concentric with the pivot pin or stud 24. When the locking bar 21 is rotated to locking position, the end 23 of the bar will ride up over the cam or wedge surface 28, thereby tilting the bar, so as to force the end 22 downwardly into firmer engagement with the arm 4 of the mating coupler.

A coiled spring 29 surrounds the bolt 25 and abuts at its respective ends against the under surface of the cross member 20 of the bracket, and the upper surface of locking bar 21. Although this spring 29 is fairly stiff, it is more resilient than the locking bar 21, so that practically all of the initial yielding movement will be taken up by the coiled spring 29.

When the coupler A is disengaged from a mating coupler, as shown in Fig. 3, the spring 29 will expand and move the locking bar 21 bodily downward along the stud 24 into engagement with the upper surface of head 11. This will take up all looseness in the parts and prevent the locking bar from rattling. When the locking bar is swung counter-clockwise to unlocked position, (as indicated in dotted lines in Fig. 1) the coupler A may be connected with a mating coupler, such as B, by vertically swinging their respective arms and cams into engagement in the usual manner. The locking bar 21 will then be swung clockwise from its dotted line position to the solid line position, shown in Fig. 1, thus swinging the end 22 outwardly over and into engagement with the arm 4 of the mating coupler, and simultaneously moving the end 23 up the wedge surface 28. The movement of end 23 up the wedge surface 28 will tilt the locking bar 21 so as to force the end 22 downwardly against the arm 4. The first effect of this movement will be to take up any looseness in the engaging parts, and force the arm 4 firmly into engagement with the cam 14. When this has been accomplished, the spring 29 will yield, permitting the central fulcrum portion of locking bar 21 to move upwardly until it engages with the shoulder 27, which limits further flexure of coiled spring 29. Further movement of the locking bar 21 along the arm 4 and up the wedge surface 28 can only be accomplished by a yielding or flexure of the locking bar 21 itself, as indicated in Fig. 2. When the locking bar is driven into this final locking position, it will be placed under sufficient strain to lock all of the parts securely in place.

It will be apparent that the combined resiliency of the spring 29 and of the locking bar 21 provide a considerable range of vertical positions of the end 22 of the locking bar, in which this bar will be effective to securely hold the coupling members in locked positions. At the same time, there is no danger of breaking or unduly straining any of the engaging parts.

In the modifications shown in Figs. 4 and 5, a bowed leaf spring 30 is substituted for the coiled spring 29, previously described. The central portion 31 of this spring is apertured to surround the bolt 25 and is bowed upwardly to engage the under surface of the cross member 20 of the bracket. The end portions 32 of the leaf spring are bowed downwardly to engage the upper surface of locking bar 21, and are preferably provided with side flanges 33 to slidably engage the respective edges of the locking bar 21 and hold the leaf spring in properly centered position. Except for the difference in the form of the auxiliary spring used, this modification operates exactly the same as the preferred form shown in Figs. 1, 2 and 3, and hereinabove described in detail.

By forming the locking bar of a plurality of laminations of spring metal, as indicated at 34 in Figs. 6 and 7, the total flexibility of the locking member can be considerably increased. While the locking bar 21 shown in either of the modifications previously described could be laminated in this manner, we have shown in Figs. 6 and 7, by way of example, a variation of the modification shown in Fig. 4. In this case, the side flanges or clips 35 at the ends of the leaf spring 30 are extended around the under surface of the locking bar, so as to hold the laminations 34 in assembled relation. If desired, separate clips for this purpose could be added, and such clips would usually be necessary when a coiled spring of the type shown in Figs. 1, 2 and 3 is used. The laminated locking bar 34 will have a greater resiliency or range of flexibility than the bar 21 shown in the first described modifications, and thus increase the range through which the locking device can yield in order to meet various operating conditions.

We claim:

1. In combination with a hose coupler comprising a head and a projecting arm adapted to engage respectively with the arm and head of a mating coupler, a locking device supported on the head and adapted to yieldingly engage the arm of a mating coupler, said device comprising a spring locking bar, a separate spring member of greater flexibility than the locking bar and positioned to be flexed by the locking bar when moved into engagement with the arm, and means for limiting this flexure of the spring member.

2. In combination with a hose coupler comprising a head and a projecting arm adapted to engage respectively with the arm and head of a mating coupler, a spring locking bar pivoted on the head and adapted to yieldingly engage the arm of a mating coupler, a second spring member of greater flexibility than the bar and positioned to be flexed when the bar is moved to locking position, and means for limiting the flexure of the spring member.

3. A hose coupler comprising a head provided with a wedge surface and a projecting arm, the head and arm having means adapted to engage with the arm and head respectively of a mating coupler, a bracket on the head, a yieldable locking member intermediately pivoted in the bracket and adapted when rotated to locking position to yieldingly engage at its respective ends with the wedge surface and the arm of the mating coupler, an auxiliary spring interposed between the locking member and the bracket, and means for limiting the flexure of this spring.

4. A hose coupler comprising a head provided with a wedge surface and a projecting arm, the head and arm having means adapted to engage with the arm and head respectively of a mating coupler, a bracket on the head, a vertical pivot stud mounted in the bracket, a yieldable locking member intermediately pivoted on the stud and vertically movable thereon, the locking member being adapted when rotated to locking position to yieldingly engage at its respective ends with the wedge surface and the arm of a mating coupler, a spring interposed between the locking member and the bracket and resisting vertical movement of the member along the stud, and means on the stud for limiting this vertical movement of the locking member.

5. A hose coupler comprising a head provided with a wedge surface and a projecting arm, the head and arm having means adapted to engage with the arm and head respectively of a mating coupler, a bracket on the head, a vertical pivot stud mounted in the bracket, a yieldable locking member intermediately pivoted on the stud and vertically movable thereon, the locking member being adapted when rotated to locking position to yieldingly engage at its respective ends with the wedge surface and the arm of a mating coupler, and a coiled spring surrounding the stud and interposed between the locking member and the bracket, and means for limiting the vertical movement of the locking member and the compression of the coiled spring.

6. A hose coupler comprising a head provided with a wedge surface and a projecting arm, the head and arm having means adapted to engage with the arm and head respectively of a mating coupler, a bracket on the head, a vertical pivot stud mounted on the bracket, the lower portion of said stud being of smaller diameter than the upper portion, a yieldable locking member intermediately pivoted for swinging and tilting movement on the lower portion of the stud and vertically movable thereon, the upward bodily movement of the locking member being limited by its engagement with the lower end of the larger upper portion of the stud, and a spring interposed between the locking member and the bracket so as to resist upward movement of the member along the stud.

EGBERT H. GOLD.
EDWARD A. RUSSELL.
THOMAS H. MANCHESTER.